(12) United States Patent
Federspiel

(10) Patent No.: US 9,822,989 B2
(45) Date of Patent: Nov. 21, 2017

(54) CONTROLLING AIR TEMPERATURES OF HVAC UNITS

(71) Applicant: Vigilent Corporation, El Cerrito, CA (US)

(72) Inventor: Clifford C. Federspiel, El Cerrito, CA (US)

(73) Assignee: Vigilent Corporation, Oakland, CA (US)

( * ) Notice: Subject to any disclaimer, the term of this patent is extended or adjusted under 35 U.S.C. 154(b) by 510 days.

(21) Appl. No.: 13/708,699

(22) Filed: Dec. 7, 2012

(65) Prior Publication Data
US 2013/0151019 A1    Jun. 13, 2013

Related U.S. Application Data

(60) Provisional application No. 61/569,728, filed on Dec. 12, 2011.

(51) Int. Cl.
*F24F 11/00* (2006.01)
*G05D 23/19* (2006.01)

(52) U.S. Cl.
CPC .......... *F24F 11/00* (2013.01); *G05D 23/1934* (2013.01); *F24F 11/0012* (2013.01); *F24F 11/0079* (2013.01); *Y02B 30/746* (2013.01)

(58) Field of Classification Search
CPC .... F24F 11/00; F24F 11/0012; F24F 11/0079; G05D 23/1934; Y02B 30/746
See application file for complete search history.

(56) References Cited

U.S. PATENT DOCUMENTS

| 4,873,649 A | 10/1989 | Grald et al. |
| 5,170,935 A | 12/1992 | Federspiel et al. |

(Continued)

FOREIGN PATENT DOCUMENTS

| EP | 0501432 | 9/1994 |
| JP | 57083825 A | 5/1982 |

(Continued)

OTHER PUBLICATIONS

International Search Report and Written Opinion mailed Sep. 25, 2009 in PCT/US2009/035905, 10 pages.

(Continued)

*Primary Examiner* — Christopher E Everett
(74) *Attorney, Agent, or Firm* — Kilpatrick Townsend & Stockton LLP

(57) ABSTRACT

Systems and methods of stabilizing HVAC systems with multiple HVAC units configured to control return air temperature or discharge air temperature are provided. HVAC units that are controlled by the return air temperature compare the return air temperature to a setpoint that determines whether the HVAC unit's operation increases, decreases, or stays the same. By adjusting the setpoint of an HVAC unit based on certain criteria (e.g., a desired operational effort of an HVAC unit) the system can be stabilized. A temperature setpoint reset (TSPR) system can be included in each HVAC unit that resets the temperature setpoint (TSP) of the HVAC unit so that the HVAC unit operates within a desired operational effort (e.g. compressor speed or valve position). A master feedback loop and optimizer loop may be implemented to further control the behavior of the HVAC system.

24 Claims, 9 Drawing Sheets

(56) References Cited

U.S. PATENT DOCUMENTS

| | | |
|---|---|---|
| 5,464,369 A | 11/1995 | Federspiel |
| 5,550,752 A | 8/1996 | Federspiel |
| 5,768,121 A | 6/1998 | Federspiel |
| 5,862,982 A | 1/1999 | Federspiel |
| 5,875,109 A | 2/1999 | Federspiel |
| 5,920,478 A | 7/1999 | Ekblad et al. |
| 6,101,459 A | 8/2000 | Tavallaei et al. |
| 6,402,043 B1 | 6/2002 | Cockerill |
| 6,470,230 B1 | 10/2002 | Toprac et al. |
| 6,557,574 B2 | 5/2003 | Federspiel |
| 6,719,625 B2 | 4/2004 | Federspiel |
| 6,865,449 B2 | 3/2005 | Dudley |
| 7,058,477 B1 | 6/2006 | Rosen |
| 7,089,087 B2 | 8/2006 | Dudley |
| 7,097,111 B2 | 8/2006 | Riley et al. |
| 7,117,129 B1 | 10/2006 | Bash et al. |
| 7,363,094 B2 | 4/2008 | Kumar |
| 7,664,573 B2 | 2/2010 | Ahmed |
| 7,676,280 B1 * | 3/2010 | Bash et al. .............. 700/17 |
| 7,839,275 B2 | 11/2010 | Spalink et al. |
| 7,847,681 B2 | 12/2010 | Singhal et al. |
| 8,224,489 B2 | 7/2012 | Federspiel |
| 8,374,731 B1 | 2/2013 | Sullivan |
| 2002/0020446 A1 | 2/2002 | Federspiel |
| 2003/0064676 A1 | 4/2003 | Federspiel |
| 2003/0067745 A1 * | 4/2003 | Patel et al. ............. 361/690 |
| 2003/0200050 A1 | 10/2003 | Sharma |
| 2004/0065097 A1 | 4/2004 | Bash et al. |
| 2005/0096789 A1 | 5/2005 | Sharma et al. |
| 2005/0278069 A1 * | 12/2005 | Bash ............... F24F 11/0009 700/276 |
| 2006/0116067 A1 | 6/2006 | Federspiel |
| 2006/0206291 A1 | 9/2006 | Bash et al. |
| 2006/0234621 A1 | 10/2006 | Desrochers et al. |
| 2007/0089446 A1 | 4/2007 | Larson et al. |
| 2009/0171512 A1 * | 7/2009 | Duncan ............. F24F 5/0035 700/300 |
| 2009/0222139 A1 * | 9/2009 | Federspiel .............. 700/278 |
| 2009/0271150 A1 | 10/2009 | Stluka et al. |
| 2011/0016337 A1 * | 1/2011 | Cepulis ............. G06F 9/4893 713/320 |
| 2011/0161059 A1 | 6/2011 | Jain et al. |
| 2011/0203452 A1 * | 8/2011 | Kucherov et al. ........... 89/36.02 |
| 2011/0203785 A1 | 8/2011 | Federspiel |
| 2012/0101648 A1 * | 4/2012 | Federspiel et al. ........... 700/291 |

FOREIGN PATENT DOCUMENTS

| | | |
|---|---|---|
| JP | 05-231693 A | 9/1993 |
| JP | 06-323595 A | 11/1994 |
| SU | 390506 A | 7/1973 |
| SU | 1259210 A1 | 9/1986 |
| SU | 1438657 A1 | 11/1988 |
| SU | 1722302 A1 | 3/1992 |
| WO | 95/01592 A1 | 1/1995 |
| WO | 2006/099337 | 9/2006 |

OTHER PUBLICATIONS

International Search Report and Written Opinion mailed Oct. 20, 2010 in PCT/US2010/046228, 13 pages.

Written Opinion mailed Feb. 14, 2013 in Singaporean Patent Application No. 201201144-1, 10 pages.

International Search Report and Written Opinion mailed Mar. 27, 2012 in PCT/US2011/048677, 10 pages.

International Search Report, dated Mar. 21, 2013, for International Patent Application No. PCT/US2012/068505, filed Dec. 7, 2012, 2 pages.

Written Opinion, dated Feb. 20, 2013, for International Patent Application No. PCT/US2012/068505, filed Dec. 7, 2012, 3 pages.

International Preliminary Report on Patentability, dated Jun. 17, 2014, for International Patent Application No. PCT/US2012/068505, filed Dec. 7, 2012, 4 pages.

* cited by examiner

CONTROLLING AIR TEMPERATURES OF HVAC UNITS

CROSS-REFERENCES TO RELATED APPLICATIONS

The present application claims priority from and is a nonprovisional application of U.S. Provisional Application No. 61/569,728, entitled "CONTROLLING AIR TEMPERATURES OF HVAC UNITS" filed Dec. 12, 2011, the entire contents of which are herein incorporated by reference for all purposes.

The present application is related to commonly owned U.S. application Ser. No. 13/215,189, entitled "ENERGY-OPTIMAL CONTROL DECISIONS FOR HVAC SYSTEMS," filed Aug. 22, 2011 and U.S. application Ser. No. 12/396,944, entitled "METHOD AND APPARATUS FOR COORDINATING THE CONTROL OF HVAC UNITS," filed Mar. 3, 2009, the disclosure of which is incorporated by reference in its entirety. the disclosure of which is incorporated by reference in its entirety.

BACKGROUND

The present invention generally relates to environmental control systems, such as heating, ventilation, and air conditioning (HVAC) systems, which can be used to control the temperature and/or humidity of common spaces, e.g., as can exist in data centers containing server computers. More specifically, embodiments of the present invention relate to controlling multiple HVAC units in a stable and efficient manner.

Modern datacenters use HVAC systems to control indoor temperature, humidity, and other variables. It is common to have many HVAC units (often referred to as computer room air conditioner (CRAC) in the data center context) deployed throughout a data center. They are often floor-standing units, but may be wall-mounted, rack-mounted, or ceiling-mounted. The HVAC units also often provide cooled air either to a raised-floor plenum, to a network of air ducts, or to the open air of the data center. The data center itself, or a large section of a large data center, typically has an open-plan construction, i.e. no permanent partitions separating the air in one part of the data center from the air in another part. Thus, in many cases, these data centers have a common space is temperature-controlled and humidity-controlled by multiple HVAC units.

HVAC units for data centers are typically operated with decentralized, stand-alone controls. It is common for each unit to operate in an attempt to control the temperature and humidity of the air entering the unit from the data center. For example, an HVAC unit may contain a sensor that determines the temperature and humidity of the air entering the unit. Based on the measurements of this sensor, the controls of that HVAC will alter operation of the unit in an attempt to change the temperature and humidity of the air entering the unit to align with the setpoints for that unit.

For reliability, most data centers are designed with an excess number of HVAC units. Since the open-plan construction allows free flow of air throughout the data center, the operation of one unit can be coupled to the operation of another unit. The excess units and the fact that they deliver air to substantially overlapping areas provides a redundancy, which ensures that if a single unit fails, the data center equipment (servers, routers, etc.) will still have adequate cooling.

However, such redundant operation with units that operate to control air returning or discharging from a unit can cause instability in the operation of the units. For example, the intake of a first unit can be coupled to the output of another unit, thereby causing the first unit to shut off. Such problems can cause inefficient operation of the system. One solution to this problem could be not to use a discharge or return air temperature, but instead use sensors that are away from the units. But, such implementations can be costly and not practical for systems with the air temperature control already implemented.

Therefore, it is desirable to provide new systems and methods for controlling HVAC units that use a return or discharge air temperature as part of the control process.

BRIEF SUMMARY

Embodiments of the invention are directed to systems, apparatus, and methods of stabilizing environmental maintenance systems with multiple environmental maintenance units (such as HVACs and CRACs) configured to control return air temperature or discharge air temperature. Most units in data centers are configured to be controlled by return air temperature. Units that are controlled by the return air temperature compare the return air temperature to a setpoint. Based on the difference from the setpoint, the unit's operation will increase, decrease, or stay the same. In theory, the unit's output is meant to bring the return air temperature closer to the setpoint. However, in practice, the operation of two or more units is coupled such that the output of the other unit can control the return air temperature (or discharge air temperature) of a first unit. Effectively, the output of an unit becomes decoupled from its own return air temperature, thereby causing unstable or inefficient operation.

To address this problem, embodiments can adjust the setpoint of a unit based on certain criteria (e.g., a desired operational effort of a unit). A return air or discharge air temperature setpoint reset (TSPR) system can be used with each unit. The TSPR resets the temperature setpoint (TSP) of the unit so that the unit operates within a desired operational effort (e.g. compressor speed or valve position). The setpoint could also be changed based on the actual temperature of the environment. Thus, although the unit is configured to use the return air temperature or the discharge air temperature, others sensors that provide an actual temperature of the environment may also be used.

According to one embodiment, a method for controlling an environmental maintenance system with a plurality of environmental maintenance units is provided. A first measure of an operational parameter of a first environmental maintenance unit of the plurality of environmental maintenance units is received. The first environmental maintenance unit is configured to compute a first temperature difference between an air temperature and a first temperature setpoint, and use the first temperature difference to determine an operation level of the operational parameter for the first environmental maintenance unit. The first measure is compared to a first operational setpoint to obtain a first operational difference. A first adjustment of the first temperature setpoint is determined based on the first operational difference. The first adjustment is sent to the first environmental maintenance unit.

The first temperature setpoint can be adjusted by calculating a first change value derived from the first operational difference, receiving an air temperature for the first unit of the plurality of units, and adding the first change value to the air temperature. The first operational setpoint can also be offset based on whether a minimum or maximum environmental control temperature (e.g., as measured by a wireless sensor that is away from a unit) has been exceeded. The first operational setpoint can also be offset based on a penalty function.

Other embodiments of the invention are directed to systems, devices, and computer readable media associated with methods described herein. A better understanding of the nature and advantages of the present invention may be gained with reference to the following detailed description and the accompanying drawings.

DEFINITIONS

Figure 1:
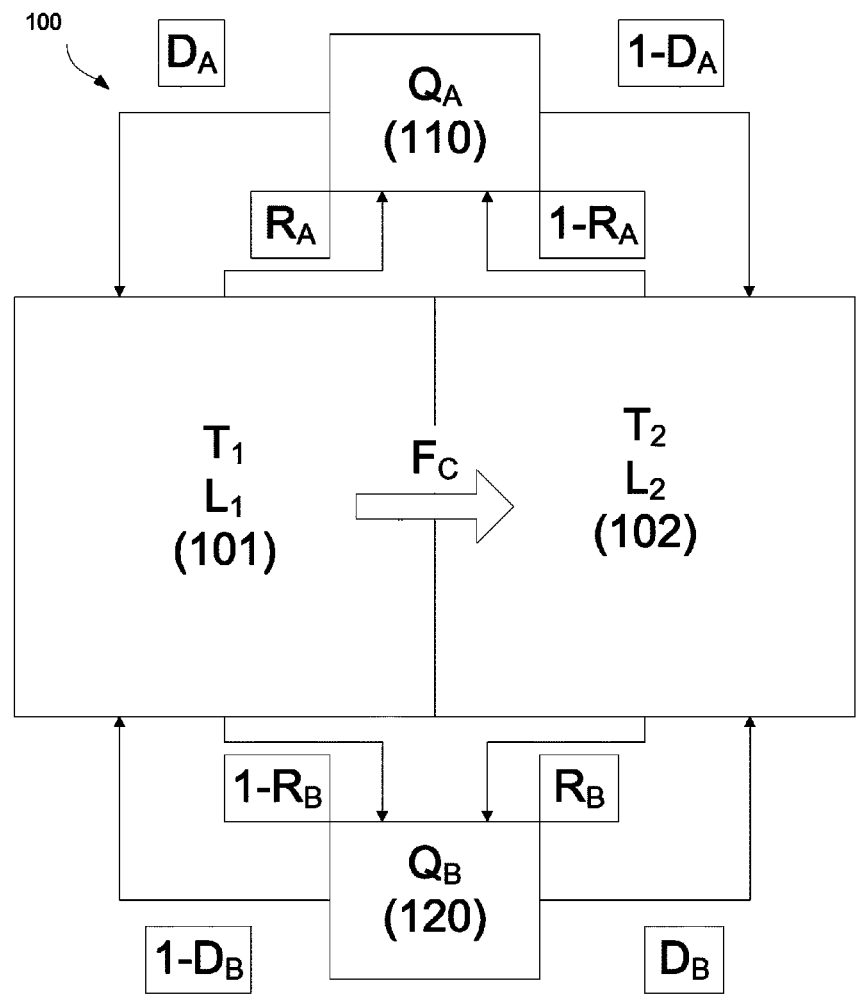
FIG. 1 shows a block diagram of an example two-state mathematical model of two HVAC systems in an environment.

As used herein, an environmental maintenance unit may be an HVAC unit, a computer room air conditioner (CRAC) unit, or any device that receives control signals and provides an output that is designed to achieve or maintain an environmental condition in a specific area. A unit can have various operational parameters, such as input parameters (e.g., an input voltage to a motor for fan speed or a control signal) and output parameters (such as a temperature of a cooling element and an actual fan speed in revolutions per second). An operational level conveys information about how much effort is being expended by an actuator (e.g., fan, compressor, etc) of a unit. Operation levels of a module can include stopped, operating at full power, percentages of input power, measured output values, percentages or values for operation of a particular device within the unit (e.g. a fan speed, temperature setpoint, humidity setpoint, or valve position), and percentages or values of the output heating or cooling power of the output air stream, e.g., as compared to a reference level.

As used herein, operational effort may be any measure of the effort of a component in operation in an environmental maintenance module. The operational effort can be determined as a function of one or more operation levels, and can be equivalent to an operation level. For example, operational effort may be a measure of the speed at which one compressor in a HVAC unit is running. Additionally, operational effort may be a measure of the total cooling or heating a HVAC unit is providing. This operational effort can be determined by adding the operational effort of each component in the HVAC unit. For example, for a HVAC unit with both fixed and variable compressors and fans, one can add the operational efforts of each component to determine the operational effort of the HVAC unit. Additionally, the operational effort can be the power consumption of components in a heater, humidifier, or any other environmental maintenance module. The operational effort is often referred to as cooling effort due to the focus on CRAC systems. However, the operational effort can be a heating effort in a heating system.

As used herein, operational effort setpoint (also called an operational setpoint) relates to a desired effort of a component (actuator) in operation in an environmental maintenance unit. A setpoint may be either a single value or the minimum or maximum value in a desired range. The operational effort setpoint can be determined based on the type of component or type of system for which the operational effort setpoint is configured.

DETAILED DESCRIPTION

Embodiments of the invention are directed to systems, apparatus, and methods of stabilizing HVAC systems with multiple HVAC units configured to control return air temperature or discharge air temperature. HVAC units that are controlled by the return air temperature compare the return air temperature to a setpoint. However, in practice, the operation of two or more HVAC units is coupled such that the output of the other HVAC unit can control the return air temperature (or discharge air temperature) of a first HVAC unit. Effectively, the output of an HVAC unit becomes decoupled from its own return air temperature, thereby causing unstable or inefficient operation.

To address this problem, embodiments can adjust the setpoint of an HVAC unit based on certain criteria (e.g., a desired operational effort of an HVAC unit). A return air or discharge air temperature setpoint reset (TSPR) system can be included in each HVAC unit. The TSPR resets the temperature setpoint (TSP) of the HVAC unit so that the HVAC unit operates within a desired operational effort (e.g. compressor speed or valve position). The setpoint could also be changed to adjust for the difference between the return air temperature and the actual temperature of the environment. Thus, although the HVAC unit is configured to use the return air temperature or the discharge air temperature, others sensors that provide an actual temperature of the environment may also be used.

In this description, the problem of instability is introduced with a simplified two-state mathematical proof of the cross-coupling instability that exists in current systems. Next, there is a brief introduction to the solution followed by a description of the general system and methods of the preferred embodiment in a flow chart and block diagram. Next, there is a description of implementation details related to one embodiment of the solution and implementation details of multiple other embodiments. Finally, additional embodiments including a master effort loop and an optimizer loop are described.

I. Instability in Air Temperature Control

A data center includes a plurality of HVAC units and a plurality of server racks. In one embodiment, HVAC units are unitary equipment that provide airflow to the data center to cool servers in server racks. In one aspect, HVAC units can cool, heat, humidify, or dehumidify air that passes through them. Embodiments of the invention described below are focused on HVAC units that are computer room air conditioner (CRAC) units, but other embodiments of the invention can implement other HVAC units that can heat, humidify, or dehumidify an environment.

Most HVAC manufacturers produce super high efficiency coolers that regulate environmental temperatures based on return air temperature instead of discharge air temperature. Although systems can be designed to regulate environmental temperatures based on discharge air temperatures, additional problems related to systems control are raised by doing so. Super high efficiency HVAC units have variable and fixed speed compressors that operate in sync to provide highly efficient cooling. These super high efficiency coolers are the preferred CRAC units to be implemented with embodiments of the invention but any HVAC units can be used.

These units can include variable speed fans that are used to measure the temperature difference in the mode of the discharge that is most desirable depending on the particular manufacturer. The fan is used to regulate the temperature difference between return and discharge air readings. If the fan speed is slowed while the compressor speed is fixed, the result is a bigger temperature difference because the air will get colder before being discharged from the unit.

Units can have sensors that report the fan and compressors speeds for each individual component. However, some units do not have sensors for each component, and some do not report power usage at all. If the unit does not report component power use for each component, sensors can be installed in order to determine the power output being used during operation of each component or HVAC unit.

Cross-Coupling Instability of Multiple CRAC Units

Field experience, computer simulations, and analytical studies of low-order systems all demonstrate that a data center group with multiple CRACs is likely to be unstable when the CRACs are configured to control return air temperature. The nature of the instability is not wildly varying temperatures or runaway temperatures. Instead, some CRACs are driven to no cooling while others are driven to full cooling and some may turn off while the remaining CRACs modulate and regulate their return air temperature. The net result is higher energy consumption even if the CRACs themselves are very efficient, and return air temperatures that do not follow the setpoints of the CRACs that are either not cooling or are running at full cooling.

The nature of the problem is cross-coupling between the various return air temperature control loops. The system is a multi-input, multi-output system that is being controlled with single-loop, distributed controllers that have compressors or chilled water valves of a CRAC paired with the return air temperature of the same CRAC.

FIG. 1 shows a block diagram of an example two-state mathematical model of two HVAC systems in an environment. The model in FIG. 1 has two "zones", 101 and 102, and two CRACs, A (110) and B (120). Discharge air from each CRAC is distributed to the zones in fractions $D_A$ and $D_B$. Air returns from the two zones to the CRACs in fractions $R_A$ and $R_B$. There is a cross-flow term, $F_C$, that is the following function of the CRAC flows, $F_A$ and $F_B$, and the discharge and return fractions:
$F_C = (D_A - D_B)F_A - (R_A - R_B)F_B$. For each zone, there is a heat transfer term from the zone to outdoors at a temperature of $T_o$.

The problem will be shown through the use of energy balance differential equations. For notational simplicity, mass terms for each zone and mass flow rates are combined with specific heat. M refers to mass times specific heat and F refers to mass flow times specific heat. Also, H refers to heat transfer coefficient times surface area.

$$M_1 \dot{T}_1 = [-H_1 + D_A(R_A - 1)F_A + (D_B - 1 + (1 - D_B)(1 - R_B))F_B]$$
$$T_1 + [D_A(1 - R_A)F_A + (1 - D_B)R_B F_B]T_2 +$$
$$D_A Q_A + (1 - D_B)Q_B + H_1 T_o + L_1$$

$$M_2 \dot{T}_2 = [D_A(1 - R_A)F_A + (1 - D_B)R_B F_B]T_1 +$$
$$[-H_2 + D_A(R_A - 1)F_A + (D_B - 1)R_B F_B]T_2 +$$
$$(1 - D_A)Q_A + D_B Q_B + H_2 T_o + L_2$$

$$M\dot{T} = AT + BQ + EX$$

$$Y = CT$$

$$M = \begin{bmatrix} M_1 & 0 \\ 0 & M_2 \end{bmatrix}$$

$$A = \begin{bmatrix} -H_1 + D_A(R_A - 1)F_A + & D_A(1 - R_A)F_A + \\ (D_B - 1 + (1 - D_B)(1 - R_B))F_B & (1 - D_B)R_B F_B \\ D_A(1 - R_A)F_A + & -H_2 + D_A(R_A - 1)F_A + \\ (1 - D_B)R_B F_B & (D_B - 1)R_B F_B \end{bmatrix}$$

$$B = \begin{bmatrix} D_A & (1 - D_B) \\ (1 - D_A) & D_B \end{bmatrix}$$

$$C = \begin{bmatrix} R_A & (1 - R_A) \\ (1 - R_B) & R_B \end{bmatrix}$$

$$E = \begin{bmatrix} H_1 & 1 & 0 \\ H_2 & 0 & 1 \end{bmatrix}$$

$$X = [T_o \ L_1 \ L_2]^T$$

The relative gain array (RGA) is a normalized form of the open-loop transfer function matrix. It is normally computed at zero-frequency (s=0). The transfer function matrix is the following function of the state variable arrays:
$G(s) = C(Ms - A)^{-1} B$. At zero frequency, this simplifies to the following:
$G(0) = C(-A)^{-1} B$. The relative gain array (RGA) is computed from the transfer function matrix as follows: RGA=G $(0)*((0)^{-1})^T$.

The relative gain array (RGA) is most commonly used to determine input-output pairing combinations of single-input, single-output controllers used with multi-input, multi-output systems. The following are facts associated with the RGA: (1) If RGA(i,j)<0, then the system will be unstable if actuator j were paired with sensor i; (2) If RGA(i,j)=0, then actuator j has no influence on sensor i; (3) If 0<RGA(i,j) <0.5, then the actuators other than j have a larger influence on sensor i than does actuator j; (4) If RGA(i,j)=1, then actuator j affects sensor i with no interaction from other loops; (5) If RGA(i,j)>1, then the other control loops besides the i,j pair have the effect of reducing the open-loop gain of the i,j pair; and (6) If RGA(i,j)>>1, then the other control loops force a very high controller gain for the i,j pair, which can cause problems.

The following rules are used for choosing pairing combinations: (1) Choose i,j pairs where RGA(i,j) is close to 1; (2) Never choose an i,j pair where RGA(i,j) is negative; and (3) Avoid i,j pairs where RGA(i,j) is very large.

In the case of most CRACs in data centers, the pairing cannot be chosen (it is fixed by the manufacturer and is usually the CRAC cooling mechanism paired with that CRACs return air temperature sensor), and it is easy to construct examples that violate the pairing rules above.

The first case is where the systems are completely decoupled such that the systems are completely independent. This case corresponds to Fact #4 above. It is the easiest to control. Due to the open-plan design of data centers, this case virtually never occurs in practice.

$$D_A = R_A = D_B = R_B = 1$$
$$M_1 \dot{T}_1 = H_1(T_o - T_1) + Q_A + L_1$$
$$M_2 \dot{T}_2 = H_2(T_o - T_2) + Q_B + L_2$$
$$RGA = \begin{bmatrix} 1 & 0 \\ 0 & 1 \end{bmatrix}$$

The second case is where there is intermediate coupling such that there is complete mixing. It corresponds to Fact #6 above.

$$D_A = R_A = D_B = R_B = 0.5$$
$$M_1 \dot{T}_1 = [-H_1 - 0.25F_A - 0.25F_B]T_1 + [0.25F_A + 0.25F_B]T_2 + 0.5(Q_A + Q_B) + H_1 T_o + L_1$$
$$M_2 \dot{T}_2 = [-0.25F_A - 0.25F_B]T_1 + [-H_2 - 0.25F_A - 0.25F_B]T_2 + 0.5(Q_A + Q_B) + H_2 T_o + L_2$$
$$A = \begin{bmatrix} -H_1 - 0.25F_A - 0.25F_B & 0.25F_A + 0.25F_B \\ 0.25F_A + 0.25F_B & -H_2 - 0.25F_A - 0.25F_B \end{bmatrix}$$
$$B = \begin{bmatrix} 0.5 & 0.5 \\ 0.5 & 0.5 \end{bmatrix}$$
$$C = \begin{bmatrix} 0.5 & 0.5 \\ 0.5 & 0.5 \end{bmatrix}$$
$$G(0) = \frac{0.25}{\det(A)} \begin{bmatrix} H_1 + H_2 + F_A + F_B & H_1 + H_2 + F_A + F_B \\ H_1 + H_2 + F_A + F_B & H_1 + H_2 + F_A + F_B \end{bmatrix}$$

The RGA is singular because the transfer function matrix cannot be inverted. The outputs are both the same; both outputs are the equally-weighted average of the zone temperatures. A small perturbation from this case will result in all RGA values being very, very large.

The third possible case is where the system is maximally coupled. This case corresponds to Fact #1. It is always unstable. This behavior occurs when the discharge from one CRAC gets directly or indirectly drawn into the return of another CRAC.

$$D_A = D_B = 1;$$
$$R_A = R_B = 0$$

$$M_1 \dot{T}_1 = [-H_1 - F_A]T_1 + F_A T_2 + Q_A + H_1 T_o + L_1$$
$$M_2 \dot{T}_2 = F_A T_1 + [-H_2 - F_A]T_2 + Q_B + H_2 T_o + L_2$$
$$A = \begin{bmatrix} -H_1 - F_A & F_A \\ F_A & -H_2 - F_A \end{bmatrix}$$
$$B = \begin{bmatrix} 1 & 0 \\ 0 & 1 \end{bmatrix}$$
$$C = \begin{bmatrix} 0 & 1 \\ 1 & 0 \end{bmatrix}$$
$$RGA = \begin{bmatrix} -F_A^2 & (H_1 + F_A)(H_2 + F_A) \\ (H_1 + F_A)(H_2 + F_A) & -F_A^2 \end{bmatrix}$$

In this case the pairing corresponds to the diagonals, which are negative. The negative diagonals imply that the cross-coupling is changing the sign of the return air temperature control loop gains, which causes positive feedback and unstable control. The only reason systems with these conditions are thought to be stable is because of the inherent constraints of the CRAC units. The only reason temperatures remain in normal levels is because one unit's component constraints stop lowering the temperature in the room. This is an extremely inefficient use of energy. Energy consumption is best when all the units are running at an intermediate level. Ideally, all the units would be running at a relatively equal level.

In the case where a CRAC distributes air to one region of the data center but gets its return air from another region of the data center, the cross-coupling is so strong that it causes the effective open-loop gain of the individual return air temperature control loops to change sign, resulting in positive feedback that drives some or all of the compressors (or chilled water valves) to either a min or max condition.

For example, an unstable situation occurs in a system with two CRAC units, where one unit with return air temperature at max and cooling the return air temperature of the other unit causes the other unit to shut off because the second unit thinks the room is cool enough. In a real data center, the CRAC units are very close to one another and one air-conditioner will produce cold air that may cool the return air sensor of another air-conditioner. This causes the second air-conditioner to stop cooling, which increases the load on the first air-conditioner, causing it to cool more. In a simple two-state mode, when the heat produced by servers is low, one air-conditioner shuts off while the other cools. As the heat production rises, the system reaches a condition where one unit runs at max cooling while the other stays off. This condition persists until the temperature rises enough to cause the OFF unit to start cooling.

The core instability occurs where one unit will be running at 100%, one unit will be regulating, or one unit will be turned off. In a real environment, this will result in flipping behavior where some units operate at 100% and other units are turned off. This flipping may only occur once every day or so as some units are turned off and others are turned on but it is still an unstable system and extremely energy inefficient.

II. Stable Control

The above system can be stabilized by adjusting the return air temperature setpoint. For example, if the return air temperature setpoint is set equal to the return air temperature, then the compressor speed or chilled water valve position will not change. One can adjust the return air temperature setpoint to a compressor "effort" or chilled water valve position that is desired. One can regulate or optimize the desired compressor effort or desired chilled water valve position. The desired compressor effort or the desired chilled water valve position are examples of a "cooling effort setpoint."

Inserting a temperature setpoint reset system can prevent the instability of return air control driving some CRAC units into Standby mode and others to 100% cooling. Instead, some embodiments can provide a relatively even distribution of compressor effort. At part-load conditions, this should yield significant energy savings over any strategy that does not stabilize the return air control because of the nonlinear speed-power relationship between fans and compressors.

Accordingly, a solution is to adjust (also referred to as reset) an air temperature setpoint of each unit in a way that stabilizes each unit at a specified cooling effort (compressor speed, valve position, etc.). The specified cooling effort of each unit can also be adjusted to minimize energy consumption while not allowing the temperatures at environmental sensors located near server inlets (out on the data center floor) to exceed specified limits.

Figure 2:
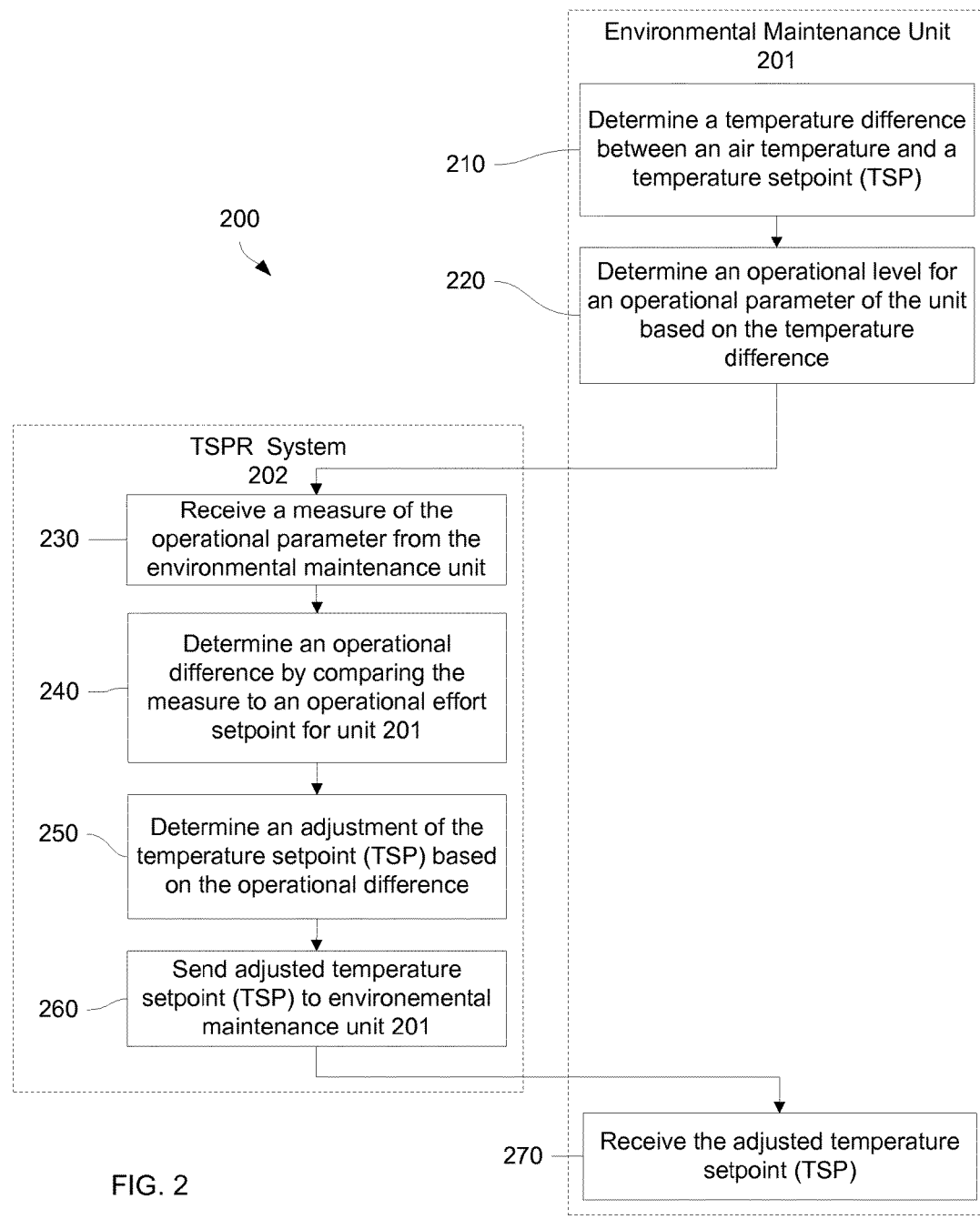
FIG. 2 shows a flow chart of a method for controlling a computer room air conditioner (CRAC) system according to embodiments of the present invention.

FIG. 2 shows a flow chart of a method 200 for controlling an environmental maintenance system according to embodiments of the present invention, implemented by the temperature setpoint reset system (TSPR). Method 200 can be used as one temperature setpoint reset system (TSPR) feedback loop in one environmental maintenance unit used to stabilize a system with multiple environmental maintenance units. Method 200 discloses that steps 210, 220, and 290 are performed by the environmental maintenance unit 201, while steps 230-280 are preformed by the TSPR system 202. However, in some embodiments the steps could be implemented by either system or both systems or the environmental maintenance unit could incorporate the TSPR system and implement all of the steps. Each unit could perform method 200 in order to stabilize the environmental maintenance unit independent of the other environmental maintenance units in the system.

First, in step 210, environmental maintenance unit 201 determines a temperature difference between an air temperature and a temperature setpoint (TSP). The environmental maintenance unit may be a CRAC or other HVAC unit depending on the environmental control goals of the system. Examples of an air temperature are a return air temperature and a discharge air temperature. A unit can be configured to measure the air at an air inlet (return air temperature) or outlet (discharge air temperature) to the unit. If a unit does not have such a capability, then a sensor (e.g., a wireless sensor) could be added. Control circuitry of the unit 201 can be used to determine the difference.

In step 220, the environmental maintenance unit uses the temperature difference to determine an operational level of an operational parameter of unit 201. The operational level can be used as an input command to change the operational parameter from an old level, e.g., if the temperature lies outside of the desired range. The operational parameter may be any input parameter (e.g., control signal for compressor effort or fan speed) of any actuator of unit 201, or even an input parameter for the whole unit, where the level can be translated into levels for each actuator.

In step 230, the temperature setpoint reset (TSPR) system receives a measure of the operational parameter from the environmental maintenance unit. In one embodiment, the measure can be the operational level as determined by the unit 201 for changing the operational parameter (e.g., the compressor or fan speed). In another embodiment, the measure can be determined by a device that directly measures an output of the actuator (e.g., the revolutions per second of a fan blade). The first measure of the operational parameter is preferably not the same air temperature that is used for computing the temperature difference in step 210.

In step 240, TSPR system 202 determines an operational difference by comparing the measure of the operational parameter to an operational effort setpoint for the respective environmental maintenance unit. The difference can be a simple subtraction, or more complicated. For example, the difference could be scaled and the values could be scaled before the difference is taken.

In step 250, TSPR system 202 determines an adjustment of the temperature setpoint (TSP) based on the operational difference. Embodiments can determine the adjustment of the temperature setpoint (TSP) by calculating a change value derived from the operational difference and adding either a fixed value or an air temperature to the change value. The change value may be calculated using a Proportional-Integral-Derivative (PID) control object or other feedback control object, which can be dedicated logic or software running on any processor in the system.

In step 260, TSPR system 202 then sends the adjusted temperature setpoint (TSP) to environmental maintenance unit 201. The transmission can be over a network cable or through internal circuitry. The adjustment can be a new TSP value or a change value, which the unit 201 can add to or subtract from the current TSP.

In step 270, the environmental maintenance unit receives the adjusted temperature setpoint (TSP). For a next cycle, when the unit 201 determines a next air temperature, the next operational level is determined by taking a difference between the next air temperature and the new TSP. Thus, unit 201 can calculate new actuator values for the environmental maintenance unit based on the adjusted temperature setpoint (TSP).

Figure 3:
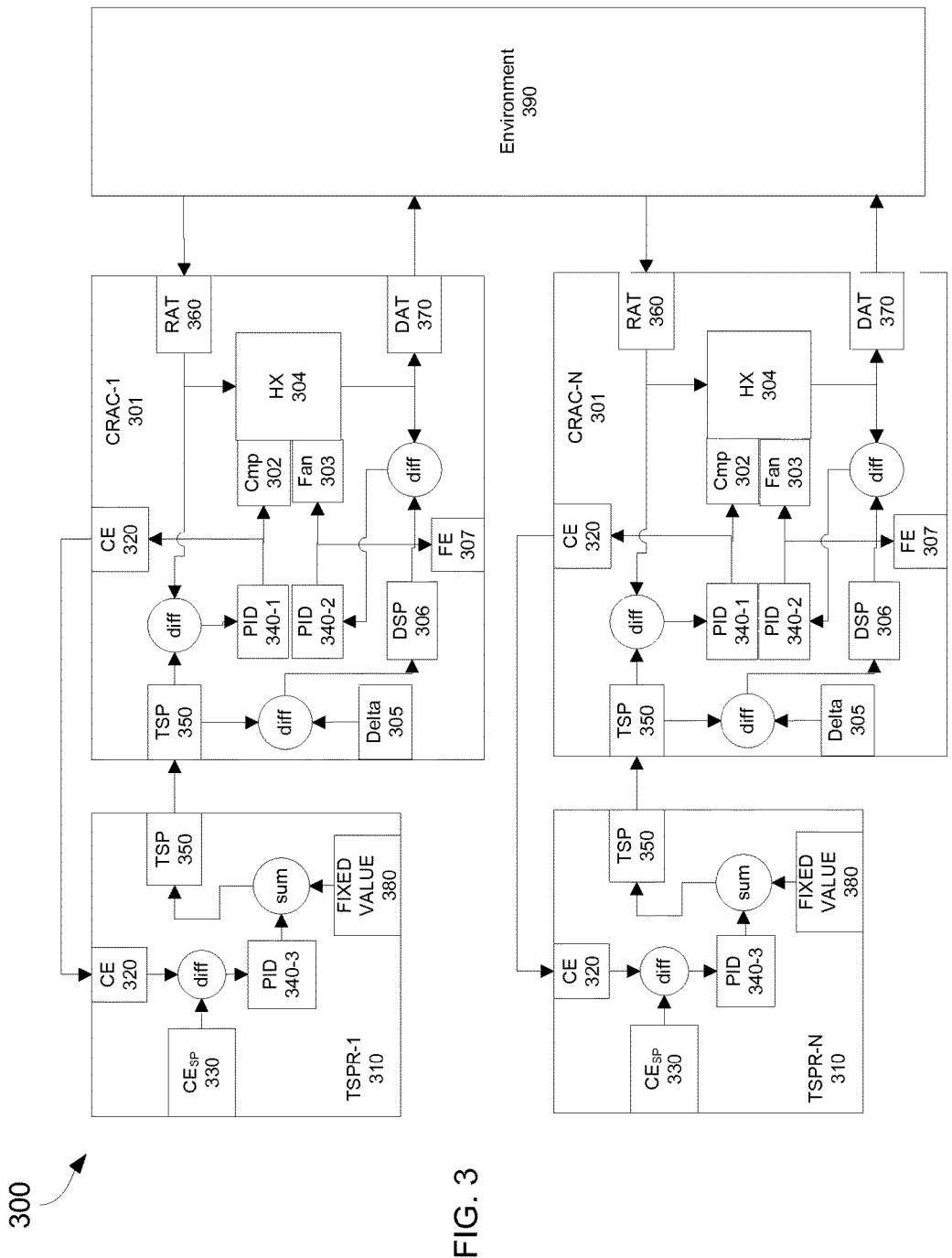
FIG. 3 shows a block diagram of a system for controlling a CRAC system according to embodiments of the present invention.

FIG. 3 shows a block diagram of a CRAC system 300 with multiple CRAC units 301 that can implement the method described above. The blocks labeled CRAC-1 301 and CRAC-N 301 show the internal control logic of a CRAC unit. The CRAC units may have air temperature sensors at their inlet or outlet points to measure a unit's return air temperature 360 and/or discharge air temperature 370, respectively. The CRAC units receive a temperature setpoint (TSP) 350 and compare that value to either the return air temperature or the discharge air temperature depending on the configuration of the CRAC unit 301. In FIG. 3, the CRAC is controlled by the return air temperature so the CRAC takes the difference between the temperature setpoint (TSP) 350 and the return air temperature (RAT) 360. The CRAC then applies a feedback control object (PID object) 340-1 to the difference between the temperatures to determine a compressor value CMP 302. The compressor value CMP 302 is then applied to a compressor which changes the heat transfer rate of a heat exchanger HX 304 to determine the amount of cooling of the CRAC. These compressor values can be for multiple compressors within the CRAC and can be for both variable and fixed speed compressors. The compressor values are used to determine a cooling effort (CE).

In some embodiments, a fan effort (FE) 307 can also be determined by finding the difference between the temperature setpoint (TSP) and a delta value 305. The delta value 305 is the difference between the return air temperature setpoint and the discharge air temperature setpoint (DSP) 306. The difference results in a discharge air temperature setpoint (DSP) 306. The DSP 306 is compared with the discharge air temperature (DAT) 370, and the result of that operation is input to a control object (PID) 340-2 which produces a speed command for the fan 303. The fan speed affects the heat exchanger HX 304 which in turn affects the DAT 370. This provides a fan value that can be used to find the fan effort (FE) 307.

Although the CRAC unit 301 shows the cooling effort (CE) 320 is determined using the return air temperature (RAT) 360 and the fan effort (FE) is determined using the discharge air temperature (DAT) 370, these may be reversed depending on the configuration of the CRAC unit 301.

For each CRAC unit 301, the temperature setpoint (TSP) 350 is regulated by a unit-specific temperature setpoint reset (TSPR) system 310. The TSPR system 310 is a closed feedback loop that compares the measured cooling effort (CE) 320 of the CRAC unit 301 to a predetermined cooling effort setpoint (CEsp) 330 and applies a feedback control object 340-3 (e.g., Proportional-Integral-Derivative (PID)) to the difference. The temperature setpoint (TSP) 350 is changed if the cooling effort (CE) 320 is outside of the desired range (CEsp) 330. A return air temperature (RAT) 360 or discharge air temperature (DAT) 370 may also be used in the TSPR system 310 to determine the amount to offset the temperature setpoint (TSP) 350. If the return air temperature (RAT) 360 or the discharge air temperature (DAT) 370 is not used, a fixed value 380 may be added to the output of the PID control object 340-3 to determine the new temperature setpoint (TSP) 350. The CRAC unit 301 then uses the new temperature setpoint (TSP) 350 to adjust the actuator position or compressor speed of the CRAC unit (CRAC-1) 301. The adjusted actuator position or compressor speed then produces a new cooling effort (CE) 320 which is input into the TSPR system 310 again. The difference leads to a further reset of the temperature setpoint (TSP) 350 which leads to further change in the output (Discharge Air Temperature) 370 of the CRAC unit 301. This process continues until the CRAC unit 301 is stabilized.

The temperature setpoint reset (TSPR) system 310 looks at the cooling effort (CE) 320 that each machine (or motor) is using—if too high, the temperature setpoint reset (TSPR) system 310 raises the temperature setpoint (TSP) 350 so cooling effort (CE) 320 will decrease. On the other hand, if the cooling effort (CE) 320 is too low, the temperature setpoint reset (TSPR) system 310 lowers the temperature setpoint (TSP) 350 so cooling effort (CE) 320 will increase. In order for the system to function, these CRAC units 301 must be able to compute cooling effort (CE) 320 (by using fan speed/compressor speed/or a combination) or it must be possible to measure the cooling effort with an auxiliary sensor. Additionally, the cooling effort (CE) 320 could be computed between CRAC units 301 (as shown) or on individual motors within the units (not shown). Effectively, the cooling effort (CE) 320 could be a particular compressor within the CRAC unit 301 or the entire CRAC unit's cooling effort. The calculations and specifics for calculating the cooling effort is explained in further detail below.

The cooling effort setpoint (CEsp) 330 is the desired range of the CRAC unit or component motor to run. This could be a fixed value (e.g. in an open loop system without knowing whether the environment is at the particular temperature you would like) or it can be variable value that changes based on feedback received from sensors in the environment (not shown). In the preferred embodiment, explained in more detail below, the desired cooling effort setpoint (CEsp) is determined from temperature sensors in the environment at server inlet locations, and by an optimizer that understands how cooling effort and power consumption are related. The measured cooling effort (CE) is compared to the cooling effort setpoint (CEsp) and the difference is used to change the cooling effort setpoint (CEsp) for future iterations.

As explained above, the temperature setpoint reset (TSPR) system for a particular CRAC unit does not have to receive a return air temperature (RAT) 360 (or discharge air temperature (DAT) 370) but will work better if it does. There are many ways to change the cooling effort setpoint (CEsp) 330 to try to match the actual return air temperature (or discharge air temperature). For example, the system could use a fixed value 380 of change if the cooling effort (CE) 320 is out of the desired range (CEsp). This embodiment is shown in in FIG. 3. However, this could take much longer to stabilize the system because the amount of change necessary is not know. Additionally, it could lead to an oscillating state where the system cannot meet the exact temperature change and oscillates above and below the target temperature. In the preferred embodiment, described below, the system can use the return air temperature (RAT) 360 to compare the cooling effort (CE) 320 in order to determine the amount of change required to reset the cooling effort setpoint (CEsp) 330. The benefit of using return air temperature (RAT) to compare the cooling effort (CE) is that you know the amount of change required to get the desired effort. Without knowing the present air temperature, the system could be arbitrarily far off without knowing it.

III. Using Return Air Temperature (RAT)

The following specific details are one example of implementation details that the system may be used with when using the return air temperature to determine the reset value of the temperature setpoint. The system may be used with many other implementations (as described above) and the system is not limited to the implementation details expressed below.

Figure 4:
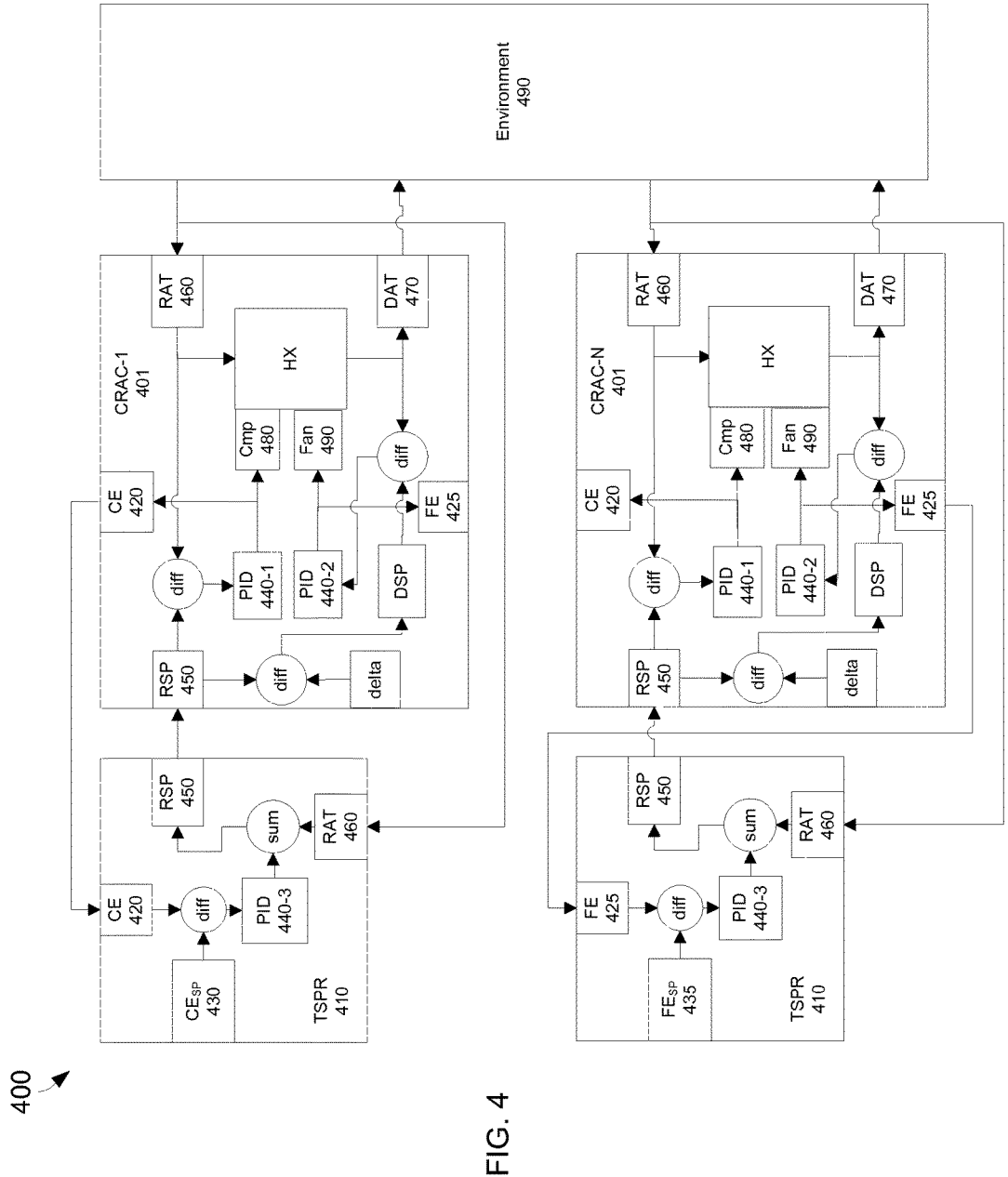
FIG. 4 shows a block diagram of a system for controlling a CRAC system according to one embodiment of the invention where return air temperature is used to set the reset temperature setpoint value.

FIG. 4 is a block diagram of a system 400 similar to FIG. 3 above, however, the return air temperature (RAT) 460 is used in the TSPR system 410 instead of a fixed value. The return air temperature (RAT) 460 is used to determine the amount to adjust (or offset) the reset return air temperature setpoint (RSP) 450. The TSPR system 410 adds the return air temperature (RAT) 460 to the output of the control object (PID) 440-3 to determine a reset return air temperature setpoint (RSP) 450. In some embodiments, the discharge air temperature (DAT) 470 may be added to output of the control object (PID) 440-3 if the CRAC unit is configured to be controlled by the discharge air temperature (DAT) 470.

In FIG. 4 there are blocks labeled CRAC-1 401 and CRAC-N 401 that show the internal control logic of a CRAC unit 401. The return air temperature setpoint (RSP) 450 is compared with the return air temperature (RAT) 460, and the compressor cooling effort 420 is increased if RAT 460 is larger than RSP 450 and decreased if RAT 460 is less than RSP 450. In FIG. 4, the TSPR-N system 410 is shown using the CRAC-N unit's 401 fan effort (FE) 4254 rather than cooling effort (CE) to show the versatility of operational parameters or operational levels of different components that may be used to adjust the return air temperature setpoint (RSP) 450. When the fan effort (FE) 425 is used, a fan effort setpoint (FEsp) 435 should be used in the temperature setpoint reset (TSPR) 410 system as well. The inputs of CE 420, CEsp 430, and RAT 460 can be made to a same input, but with each signal providing an identification. For example, the RAT signal could have an identification value that identifies the following data as being the return air temperature.

Embodiments of the TSPR system 410 that use the cooling effort (CE) 420 use cooling effort (CE) 420 instead of a single compressor effort because the CRAC may have multiple compressors (CMP) 480. Some compressors may be operated at fixed speed and others operated at variable speed. Compressor cooling effort 420 is defined as the weighted average of the speed of the compressors 480, where the weights are the fractional CRAC capacity corresponding to each compressor. For example, suppose a CRAC has two constant speed compressors C1 and C2, and two variable-speed compressors V1 and V2. Suppose further that the capacity of C1 is 15% of the total CRAC capacity, the capacity of C2 is 25% of the total CRAC capacity, the capacity of V1 at full speed is 20% of the full CRAC capacity, and capacity of V2 at full speed is 40% of the full CRAC capacity. Then the compressor cooling effort when C1 is ON, C2 is OFF, V1 is running at 50% speed, and V2 is running at 75% speed can be computed as follows:

$$CE = 1*0.15 + 0*0.25 + 0.5*0.2 + 0.75*0.4 = 0.55 \qquad (6)$$

The compressor cooling effort (CE) is the sum of the speed of each compressor times its fractional capacity. Constant speed compressors have a speed of either 0% or 100%. In some embodiments, the cooling effort may be computed by the described process every 15 seconds.

The return air temperature setpoint (RSP) of each CRAC will be reset according to the following equation:

$$RSP = RAT + PID(CEsp - CE) \qquad (7)$$

If the return air temperature PID 440-1 in the CRAC unit 401 has an integral term, then the RSP reset PID 440-3 must have a proportional term; otherwise the system will be unstable. If the PID 440-1 in the CRAC unit 401 has just a proportional term, then the RSP reset PID 440-3 must have an integral term; otherwise the system will be unstable.

Implementing the default gain parameters described above, the default proportional gain will change the return temperature setpoint (RSP) by the full setpoint range (15 degrees Celsius) if the compressor cooling effort (CE) differs from the desired compressor cooling effort (CE) by 100% (since compressor cooling effort goes from 0.0 to 1.0). The default integral gain will ramp the compressor cooling effort (CE) from 0% to 100% in 19,201,800 seconds (3230 minutes) if the compressor cooling effort (CE) differs persistently from the compressor cooling effort setpoint (CEsp) by 10%. The 3230-minute period is the time for some CRAC units to ramp its compressor cooling effort (CE) from minimum to maximum.

Inserting the temperature setpoint reset (TSPR) system can prevent the instability of return air control driving some CRAC units into Standby mode and others to 100% cooling. Instead, some embodiments can provide a relatively even distribution of compressor effort (CE). At part-load conditions, this should yield significant energy savings over any strategy that does not stabilize the return air control because of the nonlinear speed-power relationship between fans and compressors.

IV. Master Feedback Loop

It can be beneficial to include sensor measurements of the environment to ensure that the environment is maintaining a temperature within a desired range. If the servers in the system get too hot or too cold, their performance can decrease and can even damage the units. Thus, it can be beneficial to include some control feedback system to ensure that the entire environment stays within some predetermined temperature range.

Environmental sensors may be used in the server room as well. Environmental sensors are devices that measure environmental parameters, such as temperature or humidity. Environmental sensors can transmit measurements (also called readings) by any means, such as by wired or wireless communication means (e.g., Wi-Fi, Wimax, Zigby, or any other applicable protocol). The environmental sensors may be placed in strategic locations in the server room (e.g. at server air inlet locations) in order to receive an accurate indication of the temperature levels or other environmental characteristics of the servers in the environment.

Some embodiments may implement a master feedback loop to measure server inlet air temperatures using environmental sensors and use those sensor measurements to specify a master operational effort setpoint (e.g. a master cooling effort setpoint (CEsp) or fan effort setpoint (FEsp)) to each environmental maintenance unit in an environmental maintenance system. The master feedback loop can uniformly offset the operational effort setpoint (e.g. cooling effort setpoint (CEsp) in a CRAC unit) of every environmental maintenance unit at the same time. The master feedback loop implements the method 500 described in FIG. 5.

First, in step 510, a selector receives a number of environmental air temperature (EAT) readings from sensors in the environment. Some embodiments could also be altered to use sensor readings for humidity or other environmental measurements.

Next, in step 520, the selector determines the selected high temperature (SHT) by selecting the highest EAT. Some embodiments may implement a selector that determines a selected low temperature (SLT) as well, depending on the environmental control goals of the system.

In step 530, the master feedback loop compares the selected environmental air temperature (SHT or SLT) to a predetermined HighLowLimit Setpoint (HLLSP) value and calculates the temperature difference.

In step 540, the master feedback loop adjusts the master operational effort setpoint based on the temperature difference determined in step 530. The master operational effort setpoint may be adjusted using a control object (e.g., a Proportional-Integral-Derivative (PID) or a lead-lag compensator). The control object is used to determine whether the cooling effort setpoint (CEsp) of all the environmental maintenance units should be raised or lowered depending on whether the system is too hot or too cold at any point sensor point in the environment. For example, if one of the environmental sensors in a server rack is over a predetermined highlowlimit setpoint (HLLSP) of 75 degrees, the master feedback loop would increase the cooling effort setpoint (CEsp) of every CRAC unit in a CRAC system until the highest sensor reading was below the highlowlimit setpoint (HLLSP) of 75 degrees. The master feedback loop can be preferably executed at a frequency similar to the execution frequency of the TSPR system.

Finally, in step 550, the master operational effort setpoint is sent to each of the environmental maintenance units in the environmental maintenance system to be used to stabilize each unit's temperature setpoint (TSP), as described above.

Figure 5:
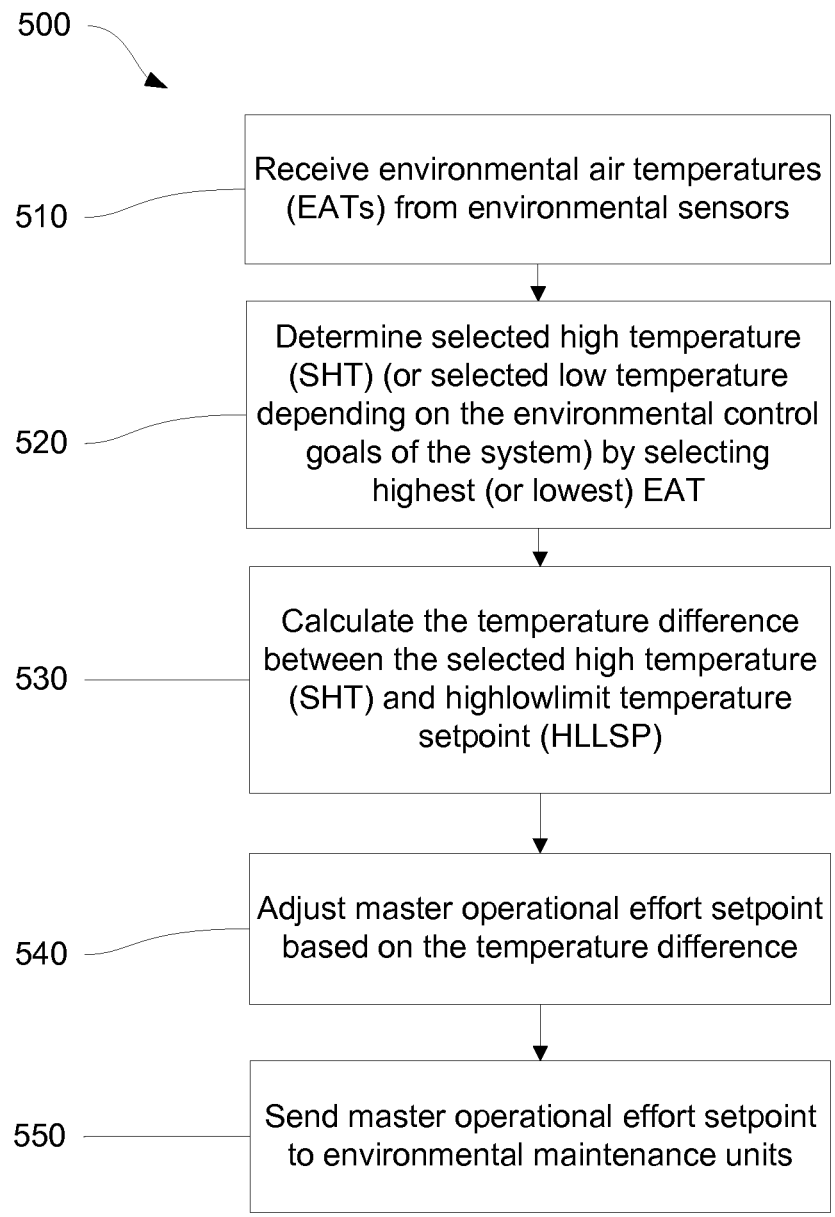
FIG. 5 shows a flow chart of a method for controlling a number of CRAC units in a CRAC system according to embodiments of the present invention using a master control loop to keep the system within maximum environmental control ranges.
Figure 6:
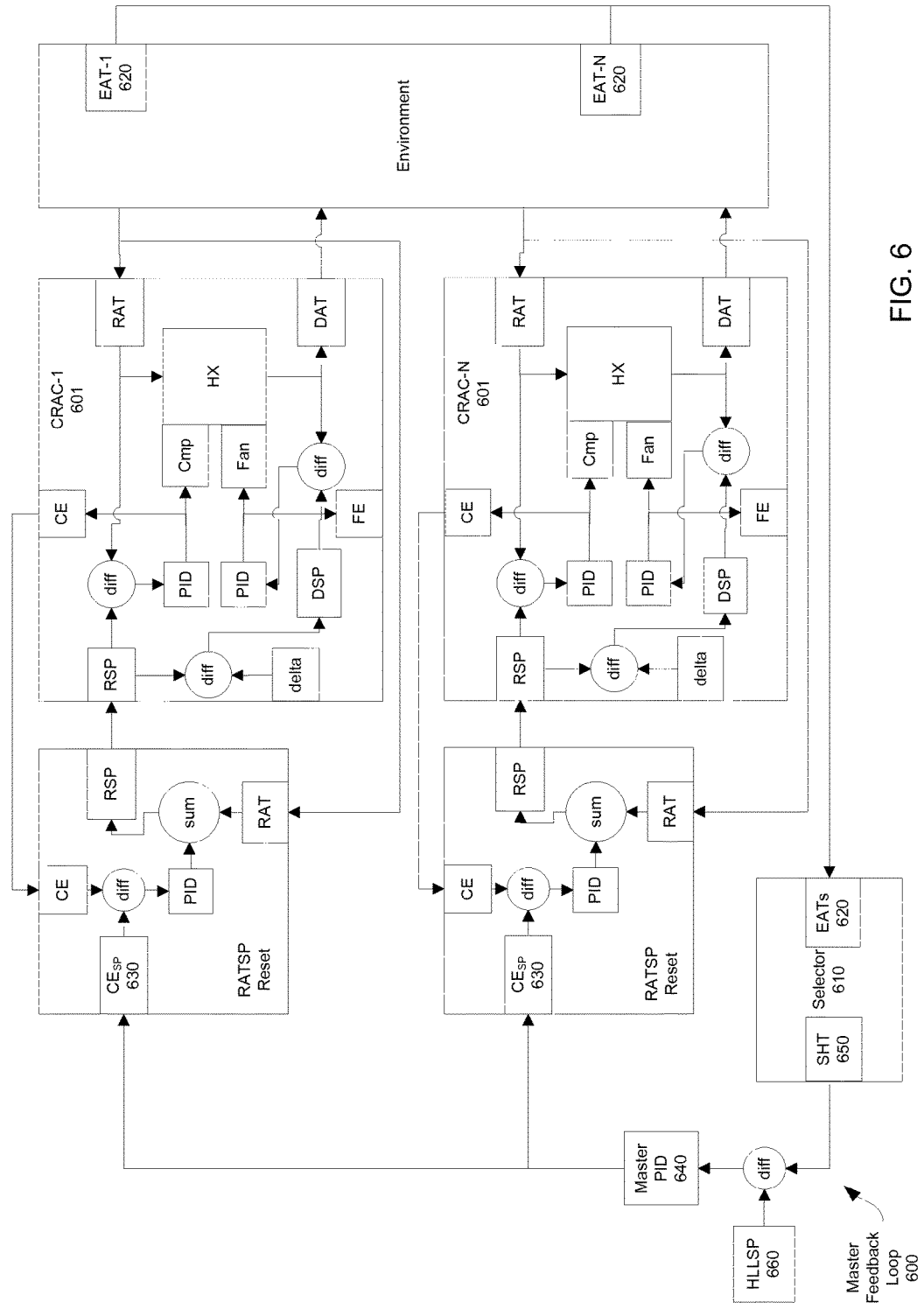
FIG. 6 shows a block diagram of a system for controlling a CRAC system according to one embodiment of the invention that implements a master feedback loop to keep the system within maximum environmental control ranges.

FIG. 6 shows a block diagram of a CRAC system implementing the method of FIG. 5 with a master feedback loop 600. The master operational setpoint in this embodiment is a cooling effort setpoints (CEsp) 630. The cooling effort setpoint (CEsp) 630 of each CRAC unit 601 is adjusted in synch by the master feedback loop control object (Master PID) 640. A selector 610 receives many temperatures from environmental air temperature (EAT) 620 sensors on the racks. The selector 610 picks the highest air temperature (SHT) 650 reading and compares it to a highlowlimit temperature setpoint (HLLSP) 660, also called an extremum setpoint Setpoint 660 is typically higher (lower for heating) than the setpoint for the CRAC units 601. A control object (Master PID) 640 is used to offset the master operational effort setpoint (CEsp) 630 of all the CRAC units depending on the difference between the selected high temperature (SHT) 650 and the highlowlimit temperature setpoint (HLLSP) 660. Therefore, the master feedback loop 600 takes feedback from the selector 610 that operates on the set of environmental air temperatures (EATs) 620 and computes a master cooling effort setpoint (CEsp) 630 for all CRAC units 601.

If the master feedback loop control object (Master PID) 640 output drives a value of CEsp below its minimum limit cooling effort or above its maximum limit cooling effort, then the PID object will be reset to keep the value of CEsp at the minimum or maximum limit.

V. Optimizer Loop

An environmental maintenance system may also include an optimizer loop to optimize the environmental maintenance system by changing a particular operational effort setpoint for each environmental maintenance unit. For example, each CRAC unit's cooling effort setpoint (CEsp) could be different from the other CRAC units in the CRAC system. The optimizer loop may optimize the cooling effort setpoint (CEsp) of each particular CRAC unit by comparing a plurality of environmental sensor readings with the cooling effort setpoint (CEsp) of each CRAC unit. The optimizer then outputs a delta value for each CRAC unit that is added to the output of the master feedback loop to change the cooling effort setpoint (CEsp) of any particular CRAC unit. For example, the optimizer could increase the cooling effort setpoint (CEsp) of CRAC units 4 and 5 by 10% but leave CRAC units 1, 2, and 3 unchanged if the areas served by CRAC units 4 and 5 was hotter than the rest of the environment. The optimizer loop may optimize the performance of the system for a number of variables and may include a penalty function, which seeks to reduce power consumption (represented by a contribution from power) accounting for the environmental temperatures (represented by a contribution from temperatures exceeding a setpoint). The optimizer loop would preferably cycle less frequently than the master feedback loop and the TSPR system described above. For example, the optimizer may cycle every 15-90 minutes while the TSPR system and the master feedback loop run every 30-60 seconds. The three types of feedback/control are always running.

The optimizer is configured to minimize total power consumption subject to environmental air temperatures not getting too high. The optimizer has a model that predicts environment temperatures 60-90 minutes in the future optimized to use the least amount of power possible. It searches through many possible implementations with future performance in mind and changes the setpoints appropriately. The optimizer computes offsets (deltas) to the master cooling effort of the master feedback loop for each particular unit and changes the units individually. The deltas can also be used without the master cooling effort (e.g. just changing the operational effort setpoint at the TSPR). The optimizer updates offsets less frequently than the unit-specific reset setpoint loop and the master feedback loop.

The optimizer loop will compute changes to the operational effort setpoint values, and will use the optimal changes to determine the offsets according to the following steps:

In step 710, the optimizer loop 700 receives environmental air temperatures (EATs) from environmental sensors. These sensors may be the same sensors as for method 500.

In step 720, the optimizer loop 700 receives operational effort setpoints for each environmental maintenance unit in the system. For example, in a CRAC system, the optimizer loop would receive cooling effort (or fan effort) setpoints for each CRAC unit (CEsp-1 to CEsp-N).

In step 730, the optimizer loop 700 computes optimal changes to the operational effort setpoint of each environmental maintenance unit in the environmental maintenance system. For example, in a CRAC system, the optimizer loop could compute optimal changes to the cooling effort setpoint (CEsp-N) of each CRAC unit. The method of computing the optimal changes to the operational parameter is provided in more detail below but the system may optimize the operational effort setpoints for any number of system parameters in different embodiments of the invention.

In step 740, the optimizer loop 700 adds the optimal change for each environmental maintenance unit to that respective environmental maintenance unit's operational effort setpoint. For example, in a CRAC system, the optimal changes will be added to the current CEsp value for each CRAC unit to determine the new CEsp for each respective CRAC unit.

In step 750, the optimizer loop 700 resets the operational effort setpoint output of the master feedback loop to the average of the new operational effort setpoints. In a CRAC system, the master feedback loop master operational effort setpoint output will be reset to the average of the new CEsp values. The master feedback loop is reset to the average of the optimal cooling effort setpoints determined by the optimizer. When this resetting is performed, the integrator of the master feedback loop is reset so that the output of the master feedback loop equals the average of the optimal cooling effort setpoints. The master feedback loop is reset by computing the value of its integral term that will yield the desired output of the control object, in this case the average of the optimal cooling effort setpoints (CEsp 1 to CEsp-N). The master feedback loop is reset because there are N+1 degrees of freedom, including the PID command and the N offsets, one for each environmental maintenance unit. The extra degree of freedom must get "used" somehow or the system would be unstable.

In step 760, the optimizer loop 700 determines the operational setpoint difference between the updated master operational effort setpoint output and the new operational effort setpoint for each particular environmental maintenance unit. In a CRAC system, a delta value will be determined by subtracting the output of the master feedback loop from the new CEsp values for each respective CRAC unit. Thus, the delta values are the offset of each particular CRAC unit's CEsp from the average of all the CRAC units' CEsp values.

In step 770, the optimizer loop 700 determines an operational effort setpoint offset (Δ) for each environmental maintenance unit by multiplying the operational setpoint difference by rho. The delta is multiplied by a correlation coefficient, rho, to determine the final offsets. More generally, rho is a metric that indicates how well the model used by the optimizer is working. In one embodiment, rho is the Pearson correlation coefficient between predicted and measured temperature changes resulting from a control change.

In step 780, the optimizer loop 700 adds each environmental maintenance unit's operational effort setpoint offset (Δ) to the master operational effort setpoint for each respective environmental maintenance unit. For example, in a CRAC system, the optimizer loop adds the cooling effort offsets (Δs) of each CRAC unit to the output of the master feedback loop (Master PID) control object to offset the CEsp for each CRAC unit.

Figure 7:
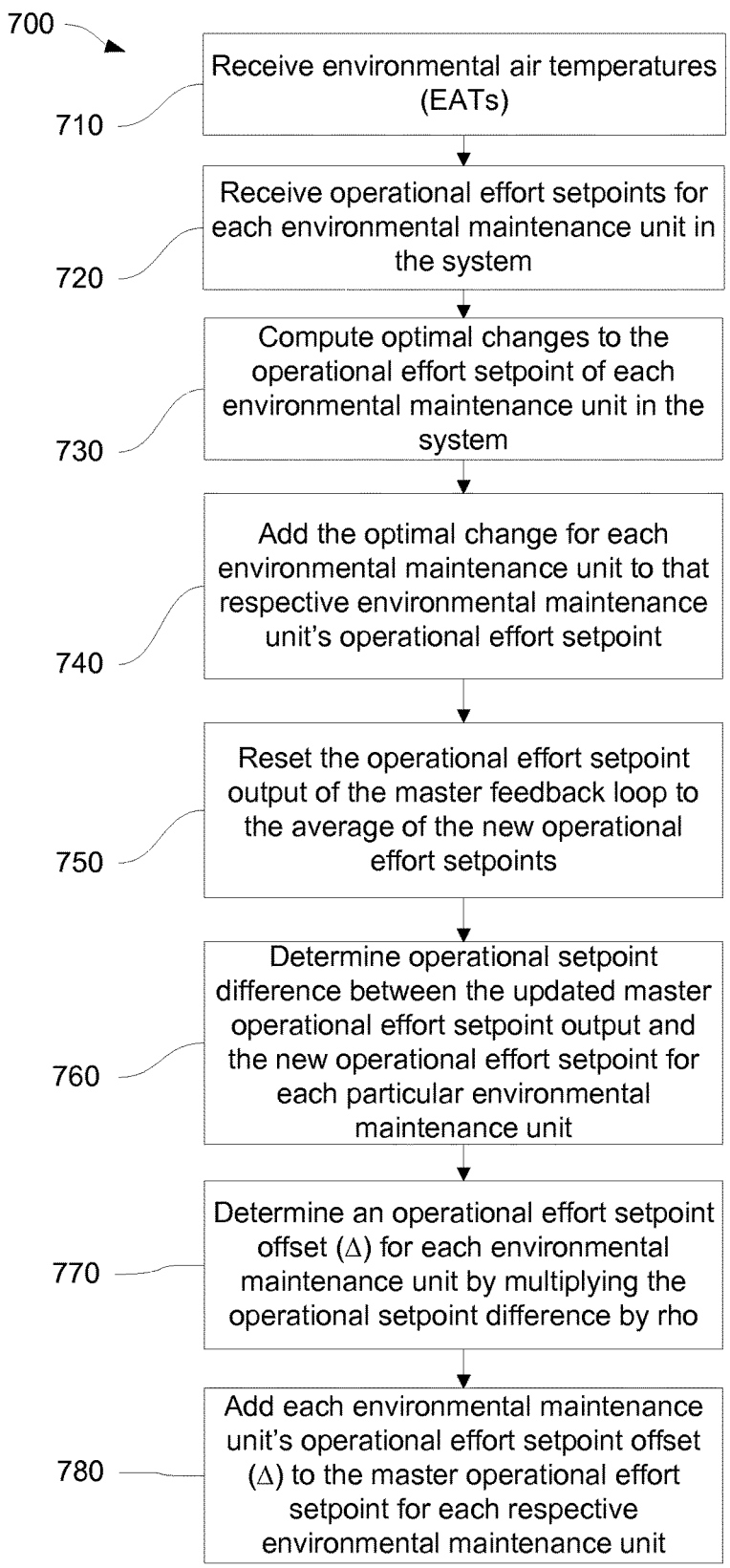
FIG. 7 shows a flow chart of a method of optimizing a CRAC system implemented by the optimizer loop according to embodiments of the present invention.

One exemplary embodiment of the system that implements the method of FIG. 7 described above, is shown in FIG. 8. An optimizer block 810 receives environmental air temperatures (EATs) 820 from environmental sensors. The optimizer block 810 receives cooling effort setpoints 830 for each CRAC unit in the system (CEsp-1 to CEsp-N). The optimizer block 810 then computes optimal change values and eventually delta values according to the optimizer loop method 700 described herein. The optimizer block 810 determines a delta value ($\Delta_N$) 850 for each individual CRAC unit ($\Delta_1$-$\Delta_N$) 850 and adds the delta value for each CRAC unit to the master cooling effort setpoint (CEsp) 840 determined by the master feedback loop (Master PID) 840 to determine each respective CRAC unit's 801 offset cooling effort setpoint (CEsp-N) 830.

VI. Penalty Function

In some embodiments, the optimizer loop can determine the desired compressor speeds of CRAC units. Additionally, the optimizer can estimate changes in fan energy consumption as compressor effort is changed. Thus, the optimizer estimates the change in the fan effort, and therefore the change in fan power, that would result from changing the compressor effort. In this manner, if a lower effort is predicted to not cause the EATs to exceed a desired range (e.g. by comparing a predicted value for each EAT to a setpoint), then the effort can be reduce to save energy. This can be determined individually for each actuator of each unit. In additional embodiments, the fan effort could be combined with fan power to "tune" the relationship between the two so that the model used by the optimizer is more accurate.

In one embodiment, a transfer model (e.g., a non-linear function or a linear function, such as a transfer matrix) can be used to predict the impact of control actions (e.g., changes in operational levels of actuators) on the environmental temperatures. This transfer model can be used to determine changes in the temperature values to determine whether the operational effort setpoints can be changed.

The penalty function can estimate power consumption of a CRAC resulting from potential changes in compressor effort as follows:

$$P_C^+ = [p_{C,p} + (1-p_{C,p})*(CEsp^+)^N]*P_{C,D} \quad (1)$$

$$p_F^+ = [p_{F,p} + (1-p_{F,p})*(S_F^+)^M]P_{F,D} \quad (2)$$

Where $P_C$ is the compressor power, $p_{C,p}$ is the fraction of compressor power consumption corresponding to parasitic losses, CEsp is the cooling effort setpoint, N is an exponent to model the power-law behavior of a compressor (default N=1.7), $P_{C,D}$ is the design compressor power (power at the design cooling effort), $P_F$ is the fan power, $p_{F,p}$ is the fraction of fan power consumption corresponding to parasitic losses, $S_F$ is the fractional fan speed, M is the exponent used to model the fan affinity law (default M=3), and $P_{F,D}$ is the design fan power (power at the full fan speed). The $^+$ notation refers to the future value of a variable. For the current value, we use a $^-$ notation.

To compute the future fan power, we need to determine the future fan speed. The fan of the CRAC is controlled to achieve a discharge air temperature that is a fixed differential below the return air temperature setpoint. Thus, the cooling rate (heat transfer rate) of the CRAC at steady state is proportional to the fan speed times the delta temperature between the return air setpoint and the discharge air setpoint.

$$Q^+ = K_F S_F^+ \Delta T \quad (3)$$

Q is the cooling heat transfer rate and $K_F$ is a units conversion coefficient. If the units of Q is Watts and the units of deltaT is degrees Celsius, then $K_F$ is the mass flow rate at the maximum fan speed times the specific heat. The mass flow rate is the volume flow rate times the density.

The future heat transfer rate is also equal to the future coefficient of performance (COP) times the future total power consumption. The coefficient of performance (COP) is the cooling heat transfer rate of a unit divided by its total power consumption.

$$Q^+ = COP^+(P_C^+ + P_F^+) \quad (4)$$

Combining the previous two equations results in a cubic polynomial for the future fan speed.

$$COP^+(1-p_{F,p})P_{F,D}(S_F^+)^M - K_F \Delta T S_F^+ COP^+(P_C^+ + p_{F,p}P_{F,D}) = 0 \quad (5)$$

While there is a closed-form solution for the roots of a cubic polynomial, they require the solver to support complex math. It may be simpler to use Newton's method to find the nearest root to the current fan speed that is consistent with the change in the compressor speed (e.g., if the compressor increases, the fan should also increase). Embodiments of the invention may comprise both solutions.

The coefficients of the cubic polynomial for the future fan speed include the future COP. The COP is a function of the return air temperature and the outdoor air temperature. For small control changes by the optimizer, we could make the assumption that the future COP equals the current COP. The transfer matrix could also be extended so that it predicts the change in the return air temperatures by change in the compressor cooling effort setpoints. With that extension, we would predict future COP based on future RAT, EAT, and a model relating RAT and EAT to COP.

The total CRAC power consumption (fan plus compressor) will be computed using the following steps: (1) Configure a point in the database for the COP; (2) Assume that the future COP equals the current COP, which will either be retrieved from the CRAC or computed as a derived point; (3) Compute the future compressor power from Equation 1 above; (4) Compute the future fan speed; (5) Compute the future fan power; and (6) Add the future fan power and the future compressor power.

In certain embodiments, with the per-CRAC TSP reset loops in place, the TSPs will differ from one environmental maintenance unit to another even if the value of rho equals zero, causing the offsets to all equal zero. In one embodiment, the optimizer uses a grid search to determine the optimal values of CEsp. The grid may correspond to allowable compressor speeds. Compressor OFF will be a valid grid point for each CRAC.

For a data center where different CRACs have different efficiency, the following behavior will be observed: (1) the cooling effort setpoints (CEsp's) will be different for each CRAC (2) the more efficient CRACs will be used to provide more of the cooling and (3) with a uniform airflow pattern and a very low cooling load (less than the cooling capacity when all units are at minimum cooling), the inefficient CRACS (CRAC) will be turned off first.

VII. Computer System

Figure 8:
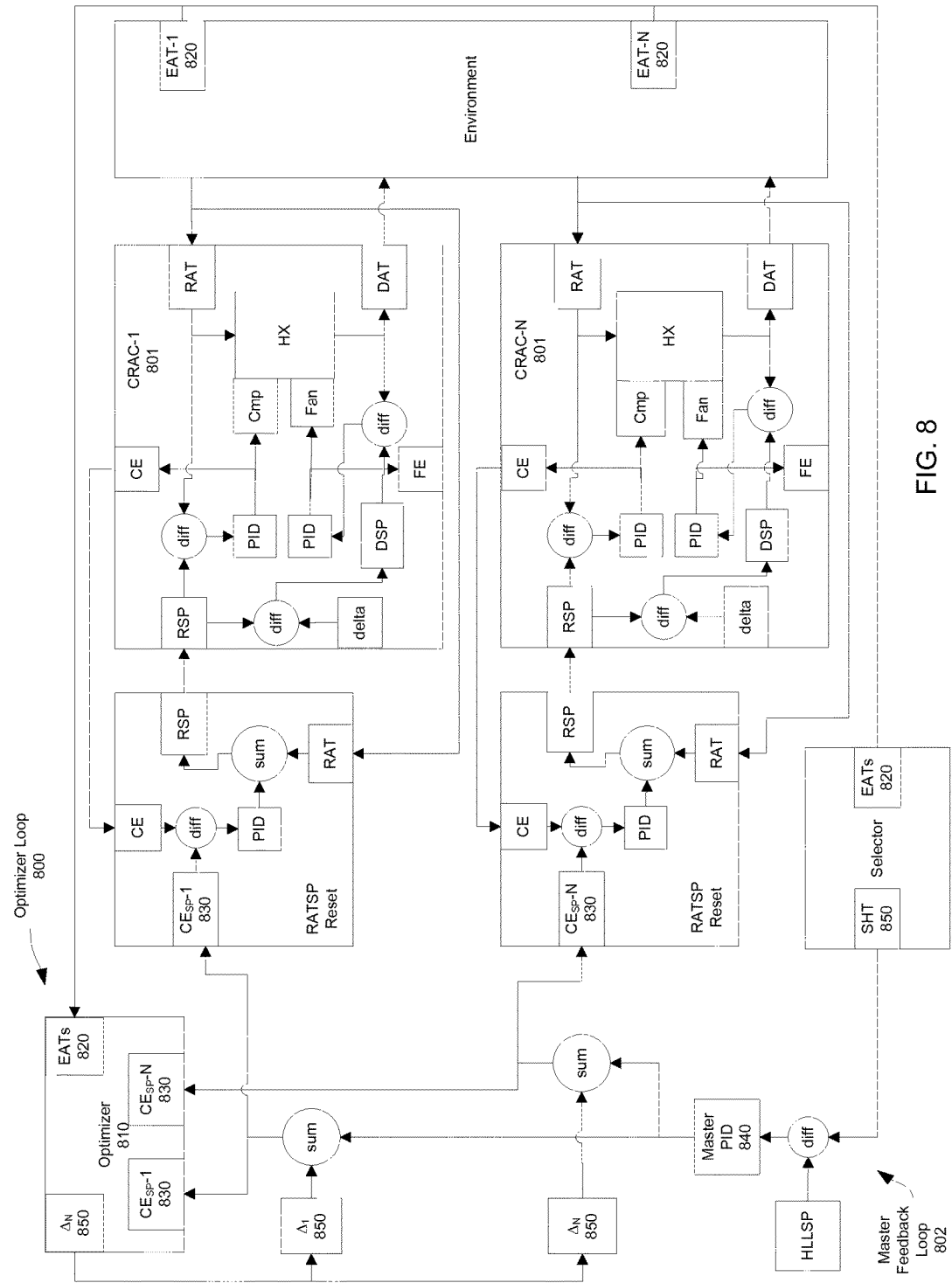
FIG. 8 shows a block diagram of a system for controlling a CRAC system according to one embodiment of the invention that implements both the master feedback loop and an optimizer loop to optimize the system response.

Any of the computer systems mentioned herein may utilize any suitable number of subsystems. Examples of such subsystems are shown in FIG. 8 in computer apparatus 800. In some embodiments, a computer system includes a single computer apparatus, where the subsystems can be the components of the computer apparatus. In other embodiments, a computer system can include multiple computer apparatuses, each being a subsystem, with internal components.

Figure 9:
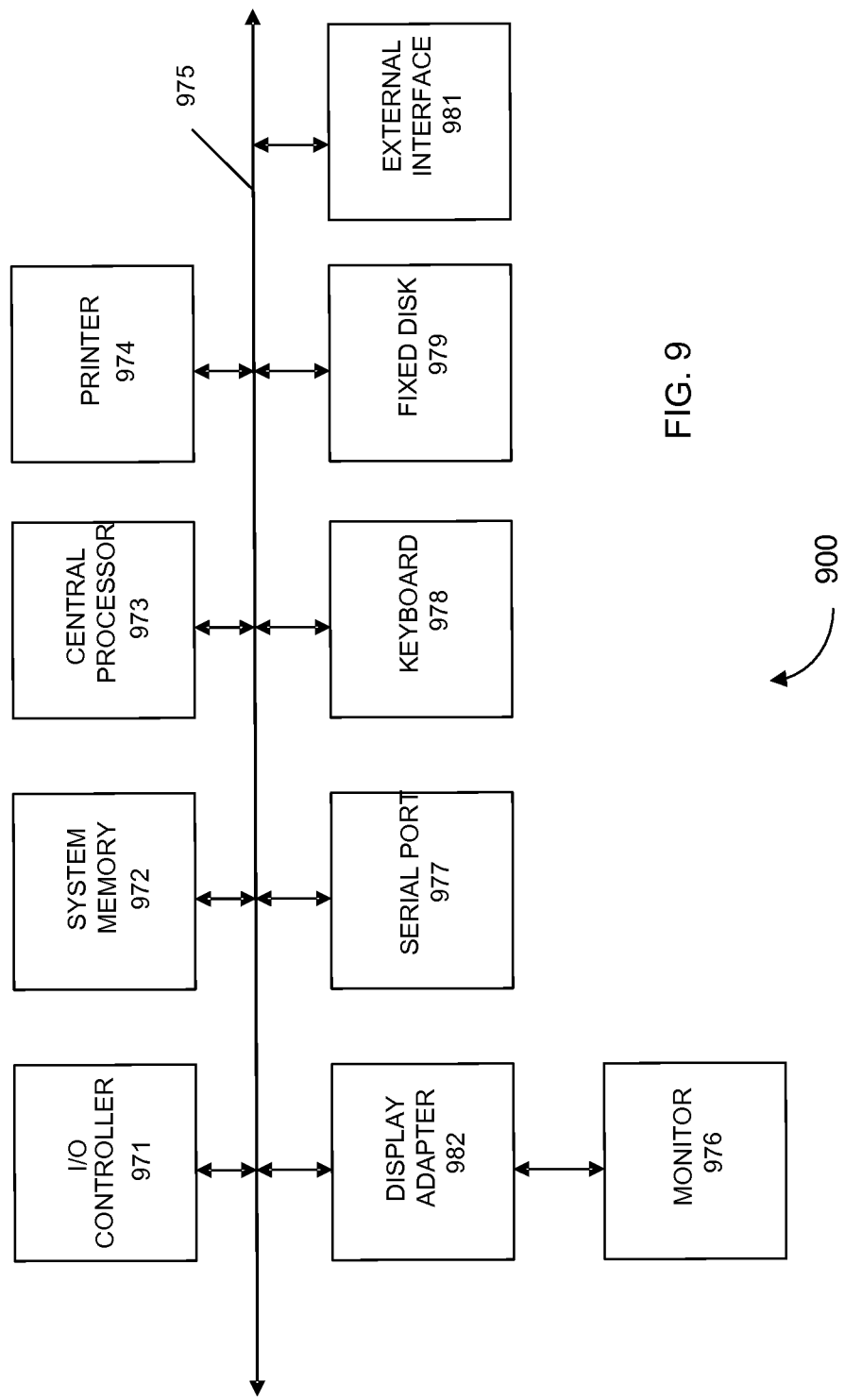
FIG. 9 shows a block diagram of an example computer system 900 usable with system and methods according to embodiments of the present invention.

The subsystems shown in FIG. 9 are interconnected via a system bus 975. Additional subsystems such as a printer 974, keyboard 978, fixed disk 979, monitor 976, which is coupled to display adapter 982, and others are shown. Peripherals and input/output (I/O) devices, which couple to I/O controller 971, can be connected to the computer system by any number of means known in the art, such as serial port 977. For example, serial port 977 or external interface 981 (e.g. Ethernet, Wi-Fi, etc.) can be used to connect computer system 900 to a wide area network such as the Internet, a mouse input device, or a scanner. The interconnection via system bus 975 allows the central processor 973 to communicate with each subsystem and to control the execution of instructions from system memory 972 or the fixed disk 979, as well as the exchange of information between subsystems. The system memory 972 and/or the fixed disk 979 may embody a computer readable medium. Any of the values mentioned herein can be output from one component to another component and can be output to the user.

A computer system can include a plurality of the same components or subsystems, e.g., connected together by external interface 981 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others.

What is claimed is:

1. A method for controlling an environmental maintenance system having a plurality of environmental maintenance units and at least one Temperature Set Point Reset (TSPR) system, the method comprising:
   receiving, at a first TSPR system from a first environmental maintenance unit of the plurality of environmental maintenance units, a first measure of an operational parameter of the first environmental maintenance unit, wherein the first environmental maintenance unit is configured to:
      compute a first temperature difference between an air temperature and a first temperature setpoint;
      use the first temperature difference to determine an operational level for controlling of a particular actuator of the first environmental maintenance unit, wherein the operational level is an input command to change the operational parameter of the particular actuator, and
      send the determined operational level for the operational parameter as the first measure for the operational parameter to the first TSPR system;
   comparing, at the first TSPR system, the first measure of the operational parameter to a first operational setpoint of the first environmental maintenance unit to obtain a first operational difference;
   determining, with a processor of the first TSPR system, a first adjustment of the first temperature setpoint of the first environmental maintenance unit based on the first operational difference; and
   sending the first adjustment to the first environmental maintenance unit, thereby controlling the first environmental maintenance unit based on the first adjustment.

2. The method of claim 1, wherein determining the first adjustment of the first temperature setpoint based on the first operational difference comprises:
   calculating a first change value derived from the first operational difference; and
   adding the first change value to a fixed value.

3. The method of claim 1, wherein determining the first adjustment of the first temperature setpoint based on the first operational difference comprises:
   calculating a first change value derived from the first operational difference;
   receiving the air temperature for the first environmental maintenance unit of the plurality of environmental maintenance units; and
   adding the first change value to the air temperature.

4. The method of claim 3, wherein the air temperature is a return air temperature or a discharge air temperature.

5. The method of claim 3, wherein the first change value is determined using a proportional-integral-derivative (PID) object.

6. The method of claim 1, wherein determining a first adjustment of the first temperature setpoint includes using a proportional-integral-derivative (PID) object.

7. The method of claim 1, wherein the first environmental maintenance unit is a computer room air conditioner (CRAC) unit, the first measure is a cooling effort, and the first operational setpoint is a cooling effort setpoint.

8. The method of claim 7, wherein the cooling effort is a weighted average of speed of a plurality of compressors of the CRAC unit, wherein the weights are fractional CRAC capacity corresponding to each compressor of the plurality of compressors of the CRAC unit, and wherein the cooling effort setpoint is a predetermined value.

9. The method of claim 7, wherein the cooling effort is a position of a cooling valve, and wherein said cooling effort setpoint is a predetermined value.

10. The method of claim 1, further comprising:
receiving a plurality of environmental air temperatures, each measured by a sensor in an environment whose temperature is being maintained; and
adjusting the first operational setpoint based on whether one of the environmental air temperatures exceed a setpoint.

11. The method of claim 1, further comprising:
receiving a plurality of environmental air temperatures, each measured by a sensor in an environment whose temperature is being maintained; and
determining an offset to the first operational setpoint, the offset being determined to reduce a penalty function, the penalty function including a first contribution of power consumption.

12. The method of claim 11, wherein the penalty function includes a second contribution from one or more differences of the environmental air temperatures from a reference temperature.

13. The method of claim 11, further comprising:
determining respective offsets for each of the environmental maintenance units.

14. The method of claim 1, wherein the environmental maintenance system includes a plurality of TSPR systems such that each environmental maintenance unit is coupled to a unique TSPR system.

15. The method of claim 1, wherein:
the first adjustment of the first temperature setpoint is a new first temperature setpoint that replaces the first temperature setpoint, or
the first adjustment of the first temperature setpoint is a change value and the first environmental maintenance unit is further configured to:
add the change value to the first temperature setpoint to determine a new first temperature setpoint that replaces the first temperature setpoint.

16. The method of claim 15, wherein the first environmental maintenance unit is further configured to:
compute a second temperature difference between the air temperature and the new first temperature setpoint;
use the second temperature difference to determine another operational level for the operational parameter for the first environmental maintenance unit; and
send the determined another operational level for the operational parameter as a second measure for the operational parameter to the first TSPR system.

17. A computer product comprising a non-transitory computer readable medium storing a plurality of instructions that when executed control a computer system to control an environmental maintenance system having a plurality of environmental maintenance units, the instructions comprising:
receiving, at a first TSPR system from a first environmental maintenance unit of the plurality of environmental maintenance units, a first measure of an operational parameter of the first environmental maintenance unit of the plurality of environmental maintenance units, wherein the first environmental maintenance unit is configured to:
compute a first temperature difference between an air temperature and a first temperature setpoint;
use the first temperature difference to determine an operational level for controlling of a particular actuator of the first environmental maintenance unit, wherein the operational level is an input command to change the operational parameter of the particular actuator, and
send the determined operational level for the operational parameter as the first measure for the operational parameter to the first TSPR system;
comparing at the first TSPR system, the first measure to a first operational setpoint of the first environmental maintenance unit to obtain a first operational difference;
determining, by the first TSPR system, a first adjustment of the first temperature setpoint of the first environmental maintenance unit based on the first operational difference; and
sending, by the first TSPR system, the first adjustment to the first environmental maintenance unit, thereby controlling the first environmental maintenance unit based on the first adjustment.

18. A Temperature Set Point Reset (TSPR) system for controlling an environmental maintenance system having a plurality of environmental maintenance units, the TSPR system comprising:
a first input for receiving, from a first environmental maintenance unit of the plurality of environmental maintenance units, a first measure of an operational effort of the first environmental maintenance unit, wherein the first environmental maintenance unit is configured to:
compute a first temperature difference between an air temperature and a first air temperature setpoint;
use the first temperature difference to determine an operational level for controlling of a particular actuator of the first environmental maintenance unit, wherein the operational level is an input command to change the operational effort of the particular actuator, and
send the determined operational level for the operational effort as the first measure being an operational level for the operational effort to the TSPR system;
a second input for receiving an operational effort setpoint;
control circuitry coupled with the first and second inputs, the control circuitry configured to calculate:
a change value using a difference between the operational effort and the operational effort setpoint; and
determine a temperature setpoint adjustment by adding the change value and a temperature value; and
an output for sending a temperature setpoint adjustment to the first environmental maintenance unit, thereby controlling the first environmental maintenance unit based on the first adjustment.

19. The system of claim 18, wherein the temperature value is a fixed value.

20. The system of claim 18, wherein the temperature value is a return air temperature input and the first temperature setpoint is a return air temperature setpoint.

21. The system of claim 18, wherein the temperature value is a discharge air temperature input and the first temperature setpoint is a discharge air temperature setpoint.

22. The system of claim 18, wherein the control circuitry includes a proportional-integral-derivative (PID) object.

23. The system of claim 18, further comprising:
master feedback circuitry for computing the operational effort setpoint based on whether a maximum environmental control temperature has been exceeded.

24. The system of claim 18, further comprising:
optimizer circuitry for computing the operational effort setpoint based on an optimization of a penalty function to reduce power consumption of the environmental maintenance system.

* * * * *